Aug. 30, 1966
J. L. COST ETAL
3,269,130
SEPARATION OF GASEOUS MIXTURES CONTAINING HYDROGEN AND NITROGEN
Filed Jan. 4, 1957
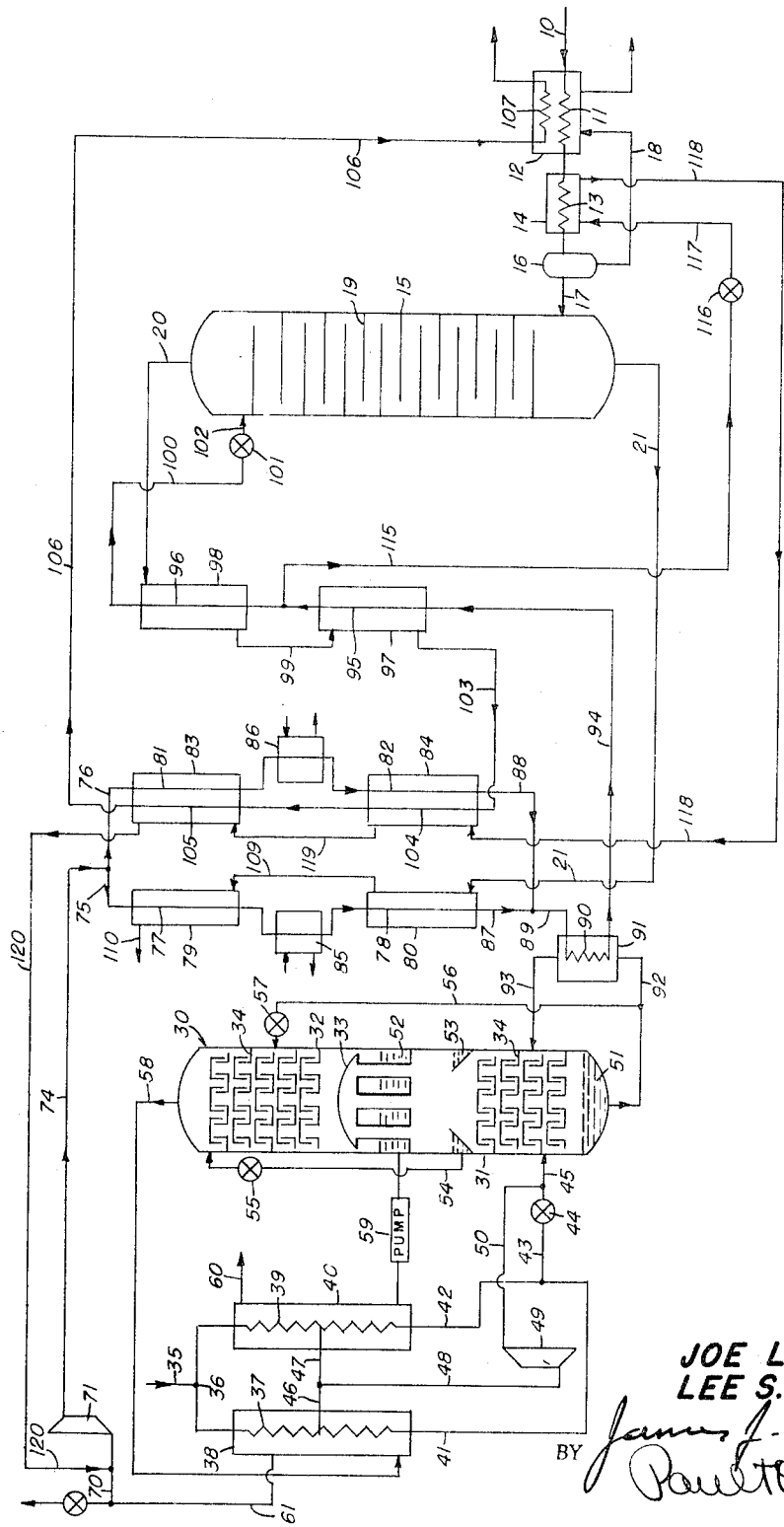
INVENTORS
JOE L. COST
LEE S. GAUMER, JR.
BY
ATTORNEY

3,269,130
SEPARATION OF GASEOUS MIXTURES CONTAINING HYDROGEN AND NITROGEN

Joe L. Cost and Lee S. Gaumer, Jr., Allentown, Pa., assignors, by mesne assignments, to Air Products and Chemicals, Inc., Trexlertown, Pa., a corporation of Delaware
Filed Jan. 4, 1957, Ser. No. 632,526
9 Claims. (Cl. 62—30)

This invention relates to separation of gaseous mixtures by cooling followed by a scrubbing operation.

In the production of hydrogen-nitrogen mixtures, such as hydrogen-nitrogen mixtures of the correct stoichiometric composition for ammonia synthesis, a gaseous mixture containing low boiling point component hydrogen and high boiling point component is cooled while under pressure and high boiling point component, such as methane or carbon monoxide for example, is removed by scrubbing the gaseous mixture with liquid nitrogen. The scrubbing operation takes place in a conventional scrubbing column provided with a series of vertically disposed plates, for example, with the gaseous mixture including high boiling point component being fed to the column below the lowermost plate and the liquid scrubbing nitrogen being introduced onto the top plate. Top gas from the scrubbing column comprises a substantially pure hydrogen-nitrogen mixture, the introgen component being a portion of the nitrogen introduced as scrubbing liquid, and the column bottom liquid comprises the remainder of the scrubbing nitrogen and high boiling point component. The quantity of liquid scrubbing nitrogen introduced into the column depends upon the quantity of high boiling point component in the feed mixture fed to the column, the number of trays, the tray efficiency and the percentage of nitrogen in the hydrogen-nitrogen mixture leaving the column which is a function of the temperature of the top gas. The temperature of the top gas from the scrubbing column may be maintained as low as possible, consistent with temperature requirements of the feed mixture entering the column, which may be limited by the solidification temperature of high boiling point component, by controlling the partial pressure of the scrubbing nitrogen on the top tray of the column. As the partial pressure of the nitrogen is lowered, the nitrogen content of the top gas decreases with a concomitant decrease in the quantity of scrubbing liquid required.

The source of nitrogen for the scrubbing liquid is ordinarily obtained from an air fractionating cycle producing oxygen and nitrogen products. A stream of gaseous nitrogen product, at atmospheric temperature and pressure, is compressed to a relatively high pressure and then passed in heat exchange with cold refrigerants to affect liquefaction of the introgen and subcooling of the introgen to a degree that may be economically obtained. In prior cycles, the liquid scrubbing nitrogen is only slightly subcooled to insure introduction of liquid into the scrubbing column; consequently a substantially greater quantity of scrubbing liquid is required than the quantity necessary to remove high boiling point component from the feed mixture since, in these cycles, the temperature of the top gas is determined, for the most part, by sensible heat of the scrubbing liquid.

The present invention provides a novel method for deeply subcooling nitrogen scrubbing liquid to maintain the liquid scrubbing nitrogen on the top tray at the lowest possible partial pressure without increasing the overall power requirement of the cycle. Thus, it is possible to reduce the quantity of scrubbing liquid to the optimum minimum requirement for removing a given quantity of high boiling point component without necessitating additional trays in the scrubbing column.

The present invention also provides a novel arrangement for establishing heat exchange relationship between the stream of compressed nitrogen and streams of top gas and bottom liquid from the scrubbing column, as well as with a relatively cold liquid of the air fractionating cycle producing the nitrogen, which further improves the economy of the cycle and makes it possible to more easily obtain the heat balance required in order to deeply subcool liquid scrubbing nitrogen. The novel heat exchange arrangement provided by the present invention also provides a source of liquefied nitrogen for use in cooling the feed mixture to the low temperature required for introduction into the scrubbing column.

According to the board concept of the present invention, liquid scrubbing nitrogen is passed in heat exchange relation with top gas from the scrubbing column at a temperature substantially corresponding to the temperature of the top gas leaving the scrubbing column, to deeply subcool the liquid nitrogen and maintain the liquid nitrogen on the top tray under a low partial pressure which in turn decreases the temperature of the top gas and its introgen content.

The accompanying drawing discloses a cycle constructed in accordance with the principles of the present invention for producing a hydrogen-nitrogen mixture in which the hydrogen is obtained from a gaseous mixture containing low boiling point hydrogen and high boiling point component including components of different boiling points, and in which the introgen for the scrubbing operation is obtained from an air fractionating cycle which also provides refrigeration for cooling the nitrogen. Although the present invention is disclosed and described in the environment of a hydrogen purification cycle in which the scrubbing liquid comprises nitrogen, it is to be expressly understood that the principles of the present invention may be applied to the separation of other gaseous mixtures and that other scrubbing liquids may be employed. Moreover, although the cycle disclosed in the drawing and described below separates hydrogen from a gaseous mixture containing high boiling point component of different boiling points in which a major portion of the high boiling point component is separated from the gaseous mixture by a partial liquefaction process prior to introduction of the gaseous mixture into the scrubbing column, it is to be expressly understood that gaseous mixture including low boiling point component and a high boiling point component may be fed to the scrubbing column at a temperature above its dew point, as a partially liquefied gas, or as a saturated gas, with or without employing a partial liquefaction process. The drawing is therefore provided for purposes of illustration only and not as a definition of the limits of the invention, reference to the latter purpose being had to the appended claims.

With reference to the drawing, a stream of compressed, gaseous feed mixture enters the cycle through conduit 10. In the case of separation of gaseous mixtures to produce a hydrogen-nitrogen mixture, in which environment the present invention is disclosed, the feed mixture may comprise a gaseous mixture including hydrogen such as coke-oven gas, gas obtained by partial oxidation from the combustion of natural gas with oxygen, hydroformer gas or a combination of hydroformer and platformer gases, for example. The feed mixture flows through pass 11 of heat exchanger 12 in countercurrent heat exchange relation with cold products of the cycle as will be described more fully below. Although one heat exchanger 12 is shown in the drawing, it is to be expressly understood that a series of heat exchangers may be employed with phase separators connected between the heat exchangers in order to progressively liquefy high boiling point components of the feed mixture and to separate the liquid and gaseous phases if the composition of the feed mixture requires this process. Liquefied high boiling point components may be expanded and passed in countercurrent heat exchange relation with the feed mixture, and sources of auxiliary refrigeration may be provided. From the heat exchanger 12, the cooled feed mixture, from which higher boiling point components may have been removed by partial liquefaction in the manner described above, is conducted through pass 13 of heat exchanger 14 wherein the feed mixture is cooled upon heat exchange with liquid nitrogen to the required temperature level for introduction into a scrubbing column 15, the liquid nitrogen being obtained in a manner described below. The feed mixture leaving the heat exchange pass 13, which may be partially liquid, may be feed directly to the scrubbing column or to a phase separator 16 from which the unliquefied portion is conducted through conduit 17 to the scrubbing column 15, the liquefied portion being withdrawn from the phase separator by way of conduit 18 and passed in countercurrent heat exchange relation with the incoming feed mixture in heat exchanger 12. The feed mixture introduced into the base of the scrubbing column 15 comprises principally hydrogen and contains high boiling point component, such as carbon monoxide or low boiling point hydrocarbons, such as methane, for example, depending upon the composition of the feed mixture. The high boiling point component is removed from the hydrogen by the scrubbing action of subcooled liquid nitrogen in the column 15. The scrubbing column 15 may be of conventional construction including a plurality of vertically spaced trays 19. The top gas is withdrawn by way of a conduit 20 and comprises a hydrogen-nitrogen mixture constituting the product stream of the cycle, while the bottom liquid including high boiling point component and scrubbing liquid is withdrawn through a conduit 21.

A source of nitrogen for the scrubbing liquid is provided by an air fractionating cycle including a conventional two-stage fractionating column 30 having a high pressure fractionating zone 31 and a low pressure fractionating zone 32 separated by a refluxing condenser 33. Each of the fractionating zones is provided with liquid-vapor contacting devices such as bubbling plates 34. A stream of compressed air feed, substantially free of carbon dioxide and other impurities, enters the air fractionating cycle by way of conduit 35, and the air feed is divided at point 36 with one portion entering pass 37 of air-nitrogen heat exchanger 38 and the other portion entering pass 39 of air-oxygen heat exchanger 40. A major portion of the air entering the heat exchange passes 37 and 39 flows therethrough in heat exchange relation with nitrogen and oxygen products and leaves the heat exchange passes by way of conduits 41 and 42, respectively, at a relatively low temperature. The conduits 41 and 42 are joined to a common conduit 43, and the major portion of the cooled air is passed through an expansion valve 44 and then introduced into the high pressure fractionating zone 31 by way of conduit 45. A minor portion of the incoming air is withdrawn from medial points of the heat exchange passes 37 and 38 by way of conduits 46 and 47 and is conducted through a common conduit 48 to an expansion engine 49 wherein the minor portion of the air feed is expanded, while doing work, to approximately the pressure of the high pressure fractionating zone 31. The effluent from the expansion engine 49 is passed through conduit 50 and is merged with the major portion of the air entering the column by way of the conduit 45. In the high pressure fractionating zone 31, a preliminary fractionation of the air takes place producing a liquid high boiling point fraction, crude oxygen, collecting in a pool 51 in the base of the column and a low boiling point gaseous fraction which flows upwardly into the refluxing condenser and is condensed upon heat exchange with liquid oxygen product collecting in a pool 52 in the base of the low pressure fractionating zone. Liquefied low boiling point fraction flows downwardly from the condenser with a portion providing reflux for the high pressure fractionating zone and with another portion collecting in a pool 53 from which it is withdrawn by way of conduit 54 and expansion valve 55 to provide reflux for the low pressure fractionating zone. A stream of high boiling point liquid is withdrawn from the pool 51 by way of conduit 56 and expansion valve 57 and introduced into the low pressure fractionating zone wherein the fractionating operation is completed producing liquid oxygen product collected in the pool 52 and gaseous nitrogen product withdrawn from the upper end of the column by way of conduit 58. Liquid oxygen product may be withdrawn from the column in gaseous phase or, as shown, in liquid phase and fed to a pump 59 which delivers liquid oxygen under relatively high pressure to the cold end of the air-oxygen heat exchanger 40, the oxygen product being vaporized in the heat exchanger and leaves the warm end of the heat exchanger by way of conduit 60 under the relatively high pressure and at substantially atmospheric temperature. The conduit 58 conducts gaseous nitrogen product to the cold end of the air-nitrogen heat exchanger 38 from which it is withdrawn at substantially atmospheric temperature and pressure through a conduit 61.

A stream of nitrogen product gas is withdrawn from the conduit 61 by way of a conduit 70 to provide scrubbing liquid for the scrubbing column 15. The conduit 70 feeds the nitrogen stream to a compressor 71 whereby its pressure is increased to a relatively high value and conducted by conduit 74 for countercurrent heat exchange relation with cold top gas and cold bottom liquid of the scrubbing column 15. As shown, the conduit 74 is connected to conduits 75 and 76 which feed substreams of the compressed nitrogen to serially connected passes 77 and 78 of heat exchangers 79 and 80, and to serially connected passes 81 and 82 of heat exchangers 83 and 84, respectively. The heat exchangers 79, 80 and 83, 84 each comprise single heat exchange zones, and are shown as separate heat exchange devices in the drawing to illustrate the manner a source of auxiliary refrigeration may be added to the nitrogen substreams at a medial point of the heat exchange paths, if desired. For example, the compressed nitrogen substream flowing through the heat exchange passes 77 and 78 may be passed in heat exchange relation with a source of auxiliary refrigeration in heat exchanger 85, while the substream of compressed nitrogen flowing through the heat exchange passes 81 and 82 may be passed in heat exchange relation with a source of auxiliary refrigeration in heat exchanger 86. The cooled substreams of compressed nitrogen leave the cold ends of the heat exchangers 80 and 84 by way of conduits 87 and 88, and the latter conduits feed a common conduit 89 connected to pass 90 of heat exchanger 91. The compressed nitrogen in the pass 90 is in heat exchange relation with a pool of boiling liquid high boiling point fraction of the air fractionating cycle supplied to the heat exchanger 91 through conduit 92 communicating with the pool 51 of the fractionating column 30, a conduit 93 being connected between the heat exchanger 91 and a point of the high pressure column 31 above the liquid pool 51 to return high boiling point fraction vapors to the fractionating zone. In the heat exchanger 91 the compressed nitrogen stream may be further cooled so that its refrigeration content is sufficient to affect total liquefaction of the compressed nitrogen stream leaving the pass 90 by way of a conduit 94. The refrigeration removed from the fractionating column upon cooling the compressed nitrogen stream in the heat exchanger 91 may be supplied to the fractionating column upon operation of the expansion engine 49, the expansion engine being operated to produce make-up refrigeration for the air fractionating cycle as well as excess refrigeration necessary to further cool the compressed nitrogen stream, such as the refrigeration required to affect its liquefaction.

The cold compressed nitrogen stream leaving the heat exchanger 91 by way of conduit 94, which stream may have a refrigeration content sufficient to affect its liquefaction, is passed in countercurrent heat exchange relation with a stream of top gas from the scrubbing column 15, the top gas being at a temperature substantially corresponding to the temperature of the top gas leaving the scrubbing column, to further cool the compressed nitrogen stream and provide deeply subcooled liquid nitrogen as scrubbing liquid for the column 15. In particular, the conduit 94 feeds serially connected passes 95 and 96 of heat exchangers 97 and 98, respectively, and conduits 20 and 99 conduct top gas directly from the scrubbing column to the heat exchangers in countercurrent heat exchange relation with the cold compressed nitrogen stream. The stream of compressed nitrogen leaves the cold end of the heat exchange pass 96 by way of a conduit 100 and is passing through an expansion valve 101 and then introduced into the scrubbing column through a conduit 102. The refrigeration content of the compressed nitrogen stream in the conduit 100 is substantially greater than the refrigeration content required to affect its total liquefaction, and inasmuch as the scrubbing column operates under a pressure less than the critical pressure of nitrogen, deeply subcooled liquid nitrogen is fed to the column 15 as scrubbing liquid.

The stream of warmed top gas flows from the heat exchanger 97 by way of conduit 103 and is conducted thereby through serially connected passes 104 and 105 of heat exchangers 84 and 83, respectively, in countercurrent heat exchange relation with a substream of the compressed nitrogen stream. The stream of top gas leaves the warm end of heat exchanger 83 by way of a conduit 106 connected to pass 107 of heat exchange device 12 for countercurrent heat exchange relation with the incoming feed mixture. The bottom liquid from the scrubbing column 15 is conducted through conduits 21 and 109 to serially connected heat exchangers 80 and 79, for countercurrent heat exchange relation with the other substream of the compressed nitrogen stream. The bottom liquid is substantially vaporized upon flowing through the heat exchangers 80 and 79, and leaves the heat exchanger 79 in gaseous phase through a conduit 110. The conduit 110 may conduct the vaporized bottom liquid to the feed mixture heat exchangers for countercurrent heat exchange relation with the feed mixture to recover remaining refrigeration therein.

The arrangement described above for deeply subcooling a stream of liquid scrubbing nitrogen for the column 15 also may be employed to provide a source of refrigeration for cooling the stream of feed mixture prior to its introduction into the scrubbing column. As shown in the drawing, a side stream of liquefied nitrogen, which may contain a refrigeration content in excess of that required to affect its liquefaction, is withdrawn by way of conduit 115 at a medial point of the heat exchangers 95 and 96. The conduit 115 conducts the side stream of liquefied nitrogen to an expansion valve 116, and a conduit 117 passes the expanded liquid nitrogen to the heat exchanger 14 for heat exchange relation with the stream of feed mixture flowing through the pass 13. Warmed nitrogen is withdrawn from the heat exchanger 14 by way of a conduit 118 and is conducted thereby through heat exchanger 82 and then by way of conduit 119 through heat exchanger 83 in countercurrent heat exchange relation with the compressed nitrogen stream flowing through passes 81 and 82. The nitrogen stream is withdrawn from the warm end of the heat exchanger 83 through a conduit 120 connected to the conduit 70 on the inlet side of the compressor 71 for recycling through the system.

In a cycle constructed and operated in accordance with the principles of the present invention disclosed herein and described above, the feed mixture comprised hydroformer gas of the following approximate composition:

| | Mol percent |
|---|---|
| Hydrogen | 85.186 |
| Water | .249 |
| Methane | 5.396 |
| Ethylene, ethane | 3.787 |
| Propylene, propane | 2.897 |
| Iso butane | .547 |
| Normal butane | .547 |
| Pentane | .498 |
| Hexane and heavier | .896 |
| | 100.00 |

The feed mixture is fed to the cycle under a pressure of 375 p.s.i.a., and after separation by partial liquefaction in heat exchangers and phase separators represented by heat exchangers 12 and 14 and phase separator 16, a feed mixture of the following composition enters the scrubbing column through conduit 17 under a pressure of 375 p.s.i.a. and at a temperature of —290° F.:

| | Mol percent |
|---|---|
| Hydrogen | 99.14 |
| Methane | .86 |
| | 100.00 |

A stream of subcooled liquid nitrogen under a pressure of 375 p.s.i.a. and at a temperature of —300° F. enters the column through the conduit 102 and the resulting scrubbing operation substantially completely removes methane high boiling component from the feed mixture. Top gas of the following composition leaves the column at a temperature of —315° F.:

| | Mol percent |
|---|---|
| Hydrogen | 89.46 |
| Nitrogen | 10.53 |
| | 100.00 |

The bottom liquid leaves the column at a temperature of —311° F. and has the following composition:

| | Mol percent |
|---|---|
| Hydrogen | 5.22 |
| Nitrogen | 60.15 |
| Methane | 34.63 |
| | 100.00 |

The nitrogen stream is delivered from the compressor at a pressure of 1025 p.s.i.a., and after passing through the heat exchangers 79, 80, 83 and 84 enters the heat exchanger 91 at a temperature of —208° F. and under a pressure of 1020 p.s.i.a. The nitrogen stream leaving the heat exchanger 91 in conduit 94 is under a pressure of 1015 p.s.i.a. and is cooled to a temperature of —255° F. In this example the refrigeration content of the nitrogen stream leaving the heat exchanger 91 is sufficient to affect its liquefaction and provide a small degree of subcooling. It is to be expressly understood that in some cases the nitrogen stream at this point in the cycle may include a refrigeration content to affect a greater or less degree of subcooling or to merely affect liquefaction. The nitrogen stream then passes through heat exchanger 97 in heat exchange relation with warmed top gas and is thereby cooled to a temperature of —266° F. A portion of the nitrogen stream is then passed through heat exchanger 98 and cooled to a temperature of —302° F. in heat exchange relation with top gas substantially at a temperature of —315° F. Upon expansion in the valve 101 to scrubber column pressure of 375 p.s.i.a., the nitrogen stream comprises deeply subcooled liquid and enters the column at a temperature of —300° F. The side stream of cold nitrogen in conduit 115 is expanded to approximately atmospheric pressure upon flowing through valve 116, and boiling liquid nitrogen in the heat exchanger 14 cools the feed mixture to the temperature at which it enters the column.

The compressor 72 delivers nitrogen at a rate of flow of approximately 14,100 pounds per hour, with about 8,600 pounds per hour of the nitrogen stream being fed to the column as scrubbing liquid and about 5,500 pounds per hour flowing to the heat exchanger 14. The feed mixture enters the column at a rate of about 4,900 pounds per hour, and approximately 8,600 pounds of scrubbing nitrogen per hour are required to remove methane high boiling point component from the feed mixture and provide top gas including 10.53 mol percent nitrogen and 89.46 mol percent hydrogen. The relatively low nitrogen mol percent of the top gas makes it possible to remove the high boiling point component from the feed mixture by feeding only 8,600 pounds of liquid nitrogen per hour to the scrubbing column. In terms of pounds mol per hour, about 307 mol pounds of sub-cooled liquid nitrogen per hour are required to remove the high boiling point component from 2,340 mol pounds of feed mixture introduced into the column per hour.

The present invention thus provides a novel method of separating gaseous mixtures including low boiling point component and high boiling point component by scrubbing cooled gaseous mixture with deeply sub-cooled liquid nitrogen produced in a novel manner which reduces the over-all power requirements of the cycle as compared to prior systems and permits a material reduction in the heat exchange surfaces required for cooling the scrubbing nitrogen.

Although only one embodiment of the present invention has been disclosed and described above, it is to be expressly understood that various changes and substitutions may be made therein without departing from the spirit of the invention as well understood by those skilled in the art. Therefore, reference will be made to the appended claims for a definition of the limits of the invention.

What is claimed is:

1. Method of separating gaseous mixtures containing low boiling point component and higher boiling point component comprising the steps of cooling gaseous mixture containing low boiling point component and high boiling point component, passing cool gaseous mixture to a scrubbing zone, scrubbing cool gaseous mixture in the scrubbing zone with subcooled liquid scrubbing material to provide top gas and bottom liquid of the scrubbing zone, the top gas including low boiling point component and scrubbing material and the bottom liquid including higher boiling point component, and passing a portion of the subcooled liquefied scrubbing material in heat interchange with the cooled gaseous mixture before the cooled gaseous mixture is passed to the scrubbing zone to further cool the gaseous mixture and warm the scrubbing material, the subcooled liquid scrubbing material being provided by passing compressed gaseous scrubbing material in countercurrent heat interchange with top gas and bottom liquid withdrawn from the scrubbing zone to cool the compressed scrubbing material, liquefying the cool compressed scrubbing material by heat interchange with relatively cold fluid, and subcooling the liquefied scrubbing material by heat interchange with top gas of the scrubbing zone at a temperature substantially corresponding to the temperature of the top gas within the scrubbing zone.

2. Method of separating gaseous mixtures containing low boiling point component and higher boiling point component comprising the steps of cooling gaseous mixture containing low boiling point component and high boiling point component, passing cool gaseous mixture to a scrubbing zone, scrubbing cool gaseous mixture in the scrubbing zone with subcooled liquid scrubbing material to provide top gas and bottom liquid of the scrubbing zone, the top gas including low boiling point component and scrubbing material and the bottom liquid including higher boiling point component, and passing a portion of the subcooled liquefied scrubbing material in heat interchange with the cooled gaseous mixture before the cooled gaseous mixture is passed to the scrubbing zone to further cool the gaseous mixture and warm the scrubbing material, and passing the warm scrubbing material in countercurrent heat interchange with compressed scrubbing material prior to liquefaction of the scrubbing material, the subcooled liquid scrubbing material being provided by passing compressed gaseous scrubbing material in countercurrent heat interchange with top gas and bottom liquid withdrawn from the scrubbing zone to cool the compressed scrubbing material, liquefying the cool compressed scrubbing material by heat interchange with relatively cool fluid, and subcooling the liquefied scrubbing material by heat interchange with top gas of the scrubbing zone at a temperature substantially corresponding to the temperature of the top gas within the scrubbing zone.

3. Method of separating gaseous mixtures as defined in claim 2 including the step of recycling the portion of scrubbing material passed in heat interchange with the gaseous mixture.

4. Method of separating gaseous mixtures containing hydrogen and higher boiling point component, which method comprises cooling gaseous mixture containing hydrogen and high boiling point component, passing cooled gaseous mixture to a scrubbing zone, scrubbing cooled gaseous mixture in the scrubbing zone with subcooled liquid nitrogen to provide top gas and bottom liquid of the scrubbing zone, the top gas including hydrogen and nitrogen and the bottom liquid including higher boiling point component, and passing a portion of the subcooled liquid nitrogen in heat interchange with the gaseous mixture prior to passing the gaseous mixture into the scrubbing zone, the subcooled liquid nitrogen being provided by passing compressed gaseous nitrogen in countercurent heat interchange with top gas and bottom liquid withdrawn from the scrubbing zone to cool the compressed nitrogen, liquefying the cool compressed nitrogen by heat interchange with relatively cold fluid, and subcooling the liquefied nitrogen by heat interchange with top gas of the scrubbing zone at a temperature substantially corresponding to the temperature of the top gas within the scrubbing zone.

5. Process for the decomposition of a hydrogen-containing gas mixture involving washing at least one difficultly condensible component out of said gas mixture by contacting it with liquid nitrogen which comprises simultaneously operating a gas decomposing plant operating upon said gas mixture and an air decomposing plant, withdrawing nitrogen from said air decomposing plant, compressing the nitrogen to the pressure required for said washing operation, precooling the compressed nitrogen by indirect heat exchange with at least one fraction of said hydrogen-containing gas mixture in said gas decomposing plant, further cooling and at least partially liquifying said precooled nitrogen by indirect heat exchange in said air-decomposing plant and returning the resulting liquefied nitrogen to said gas decomposing plant and using it therein as the washing liquid.

6. Process as defined in claim 5 in which the precooled nitrogen is liquefied at least in part in indirect heat exchange with oxygen enriched liquid air.

7. Process as defined in claim 5 for the production of hydrogen in which a portion of the liquid nitrogen is separated from the washing nitrogen and evaporated in indirect heat exchange with the gas mixture to be purified.

8. Apparatus for the decomposition of a hydrogen-containing gas mixture consisting of a gas decomposition plant comprising a liquid nitrogen washer for said gas mixture and a heat-exchanger for cooling nitrogen, an air separation plant, and a condenser for liquefying the washing nitrogen which is cooled in said heat-exchanger of the gas decomposition plant by heat-exchange with a fraction withdrawn from said gas decomposition plant, said condenser being situated in said air separation plant and two connecting lines between said two plants, one connecting said heat-exchanger of said gas decomposition plant with said condenser and the other connecting said condenser with said nitrogen washer in the gas decomposition plant.

9. Method of separating gaseous mixtures containing hydrogen and higher boiling point component, which method comprises cooling a stream of gaseous mixture, and scrubbing a stream of cold gaseous mixture including hydrogen and higher boiling point component with a stream of subcooled liquid nitrogen scrubbing material to remove higher boiling point component therefrom and provide a gas mixture including substantially hydrogen and gaseous nitrogen scrubbing material and a liquid mixture including higher boiling point component and liquid nitrogen scrubbing material, the stream of subcooled liquid nitrogen scrubbing material being provided by separating air in a fractionating operation to provide a nitrogen product, compressing a stream of nitrogen product, passing the compressed stream of nitrogen product in countercurrent heat exchange relation with gas mixture and liquid mixture from the scrubbing step to cool compressed nitrogen product, passing cool compressed nitrogen product in heat exchange relation with a relatively cold fluid of the fractionating operation to further cool the compressed nitrogen stream and provide a refrigeration content thereof sufficient to effect its liquefaction, and subcooling the stream of nitrogen product by passing the nitrogen product stream in countercurrent heat exchange relation with gas mixture from the scrubbing step at a temperature substantially corresponding to the temperature of the gas mixture following the scrubbing step, the fractionating operation including the step of expanding with work a relatively high pressure fluid stream thereof to supply the refrigeration removed from the fractionating operation upon cooling the compressed nitrogen product.

References Cited by the Examiner

UNITED STATES PATENTS

| | | | |
|---|---|---|---|
| 1,830,610 | 11/1931 | Linde | 62—175.5 |
| 1,843,043 | 1/1932 | Patart | 62—175.5 |
| 1,870,096 | 8/1932 | Claude | 62—175.6 |
| 2,293,601 | 8/1942 | Etienne | 62—20 |
| 2,820,769 | 1/1958 | Haringhuizen. | |
| 2,844,944 | 7/1958 | Becker | 62—20 X |
| 2,849,867 | 9/1958 | Haringhuizen. | |

FOREIGN PATENTS 1,123,353 6/1956 France.

NORMAN YUDKOFF, *Primary Examiner.*

RICHARD A. O'LEARY, CORNELIUS D. ANGEL,
             *Examiners.*

R. C. STEINMETZ, D. D. JEFFERY, S. H. PARKER, R. A. HILL, *Assistant Examiners.*